(12) United States Patent
Anders et al.

(10) Patent No.: US 7,953,107 B2
(45) Date of Patent: May 31, 2011

(54) METHOD AND SYSTEM FOR USING SERVICES WITHIN A COMMUNICATION NETWORK

(75) Inventors: Gert Anders, Elsterwerda (DE); Hagen Böhme, Burkhardtsdorf (DE); Robert Görsch, Marienberg (DE)

(73) Assignee: Siemens Aktiengesellschaft, Munich (DE)

( * ) Notice: Subject to any disclaimer, the term of this patent is extended or adjusted under 35 U.S.C. 154(b) by 428 days.

(21) Appl. No.: 10/572,898

(22) PCT Filed: Sep. 25, 2003

(86) PCT No.: PCT/DE03/03202
§ 371 (c)(1),
(2), (4) Date: Dec. 21, 2006

(87) PCT Pub. No.: WO2005/041490
PCT Pub. Date: May 6, 2005

(65) Prior Publication Data
US 2007/0112976 A1 May 17, 2007

(51) Int. Cl.
*H04J 3/22* (2006.01)
(52) U.S. Cl. ... 370/466; 370/464; 370/465; 340/286.01; 340/286.02
(58) Field of Classification Search ............ 370/464, 370/465, 466; 705/1, 14; 709/223, 224, 709/250; 340/870.01, 870.02, 870.03
See application file for complete search history.

(56) References Cited

U.S. PATENT DOCUMENTS

| | | | |
|---|---|---|---|
| 5,732,074 A | | 3/1998 | Spaur et al. |
| 7,075,919 B1 * | | 7/2006 | Wendt et al. .................. 370/352 |
| 2002/0042845 A1 * | | 4/2002 | Burmann et al. .............. 709/249 |
| 2002/0116505 A1 * | | 8/2002 | Higgins et al. ................ 709/227 |
| 2002/0120671 A1 * | | 8/2002 | Daffner et al. ................ 709/201 |
| 2002/0124056 A1 * | | 9/2002 | Dutta et al. ................... 709/218 |
| 2002/0175725 A1 | | 11/2002 | Barrenscheen et al. |
| 2003/0023761 A1 * | | 1/2003 | Jeansonne et al. ............ 709/250 |

(Continued)

FOREIGN PATENT DOCUMENTS

WO    WO 03/007090 A2    1/2003

OTHER PUBLICATIONS

Robert Ott, Heinrich Reiter: "Connecting EIB Components to Distributed Java Applications"; 1999 Engineering Technologies and Factory Automation 1999 Proceedings ETFA '99, 1999 7TH IEEE International Conference in Barcelona, Spain; Oct. 18-21, 1999; pp. 23-26, XP010365789; ISBN: 0-7803-5670-5; Piscataway, NJ, USA.

*Primary Examiner* — William Trost, IV
*Assistant Examiner* — Charles C Jiang

(57) ABSTRACT

A system and a method for the use of services within at least one communication network with internet mechanisms and at least one automation system, as well as a service access unit to connect an automation system to a communication network. A system is proposed for the improved use of services within at least one communication network with internet mechanisms and at least one automation system, with components of the automation system being coupled together by a conventional field bus, with a service access unit being provided to connect the conventional field bus to the communication network, with the service access unit being provided as client for the services provided in the communication network and with the service access unit having a transformation unit, provided to adapt a first communication protocol of the services to a second communication protocol of the field bus.

10 Claims, 4 Drawing Sheets

U.S. PATENT DOCUMENTS

| | | | |
|---|---|---|---|
| 2003/0051027 A1* | 3/2003 | Aupperle et al. | 709/224 |
| 2003/0083941 A1* | 5/2003 | Moran et al. | 705/14 |
| 2003/0161332 A1* | 8/2003 | Ohno et al. | 370/401 |
| 2003/0202486 A1* | 10/2003 | Anton et al. | 370/329 |
| 2004/0100975 A1* | 5/2004 | Kreiner et al. | 370/401 |
| 2004/0268176 A1* | 12/2004 | Greenlee et al. | 714/4 |

* cited by examiner

US 7,953,107 B2

METHOD AND SYSTEM FOR USING SERVICES WITHIN A COMMUNICATION NETWORK

CROSS REFERENCE TO RELATED APPLICATIONS

This application claims priority to the International Application No. PCT/DE2003/003202, filed Sep. 25, 2003, which is incorporated by reference herein in its entirety.

FIELD OF INVENTION

The invention relates to a system and a method for the use of services within at least one communication network with internet mechanisms and at least one automation system, as well as a service access means for connecting an automation system to a communication network.

BACKGROUND OF INVENTION

The unpublished DE 1 022 98 79 describes a data processing system with improved provision of services for the provision of functionalities. The data processing system thereby has at least one first service for activating and deactivating at least one second service.

In a data processing system of this type services for the provision of functionalities can be implemented in particular as so-called web services. Web service technology is used increasingly in the internet and helps to transform the internet from a user-centered information medium to an information and web service environment that can be used directly by applications. In this process standard internet technologies (HTTP, SOAP, WSDL, UDDI) are generally used in order to be able to use web services directly in an application.

SUMMARY OF INVENTION

An object of the invention is to improve the use of services within a communication network with internet mechanisms and within an automation system.

This object is achieved by the claims. A system is thereby proposed for the use of services within at least one communication network with internet mechanisms and at least one automation system, with components of the automation system being coupled together by means of a conventional field bus, with a service access means being provided to connect the conventional field bus to the communication network, with the service access means being provided as client for the services provided in the communication network, with the service access means having transformation means, which are provided to adapt a first communication protocol of the services to a second communication protocol of the field bus.

A method is furthermore proposed for the use of services within at least one communication network with internet mechanisms and at least one automation system with components coupled together by means of a conventional field bus, with which method a service access means connects the conventional field bus to the communication network, the service access means operates as client for the services provided in the communication network and transformation means of the service access means adapt a first communication protocol of the services to a second communication protocol of the field bus.

The object is also achieved by a service access means for connecting an automation system to a communication network with internet mechanisms, which is provided as client for services provided in the communication network and which has transformation means, which are provided to adapt a first communication protocol of the services to a second communication protocol of a conventional field bus connecting components of the automation system.

Automation engineering systems generally have a complex structure. The components of the automation systems are networked by means of specific communication systems (e.g. actuator-sensor buses, field buses, industrial Ethernet). With the internet in particular there is a parallel standardized communication network with internet mechanisms available worldwide, via which numerous services can be provided. According to the invention services are made available for automation engineering systems in a flexible manner. These systems do not themselves necessarily have to have an internet architecture with the corresponding internet mechanisms or protocols. The flexible architecture allows the transformation of services of the communication network with internet mechanisms to the automation system with lower-level conventional field bus beyond the boundaries of the communication network with internet mechanisms. The invention allows services to be commissioned for automation systems from any location, thereby benefiting from the advantages of a widely distributed network.

The service requested by the automation system ultimately becomes active in the automation system itself. This requires a service access means to establish the connection between services and automation system. According to an advantageous embodiment of the invention this service access means is part of the automation system, in other words it is integrated in the automation system as a component of the automation system. This reduces the number of components required in the system.

According to a further advantageous embodiment of the invention the communication network has at least one central register means to provide information about at least some of the services. The service access means also has search means, which can be used to address the central register means. There is therefore an architecture, which is characterized in that there are register means (Yellow Pages) in the communication network with internet mechanisms, said means containing details of available services. A service user does not necessarily have to know these register means. An enquiry using the search means takes said user to these register means where they obtain information about which services are available for their automation system. A service user can thereby be both a person (e.g. customer, service engineer) or a technical system (e.g. unit, computer, component).

In the internet in particular numerous services are provided as so-called web services. According to a further advantageous embodiment of the invention the services that are provided or used are such web services. Web services use standard internet protocols and mechanisms, e.g. HTTP (HyperText Transfer Protocol), SOAP (Simple Object Access Protocol), WSDL (Web Service Description Language). The service user is directed to a first service provider via the selection (manual or automated) of the required web service. The first service provider will generally require further resources (e.g. database server) to implement the service. Any number of further service providers are therefore called on to implement the service. The roles of service provider (=server) and service user (=client) therefore alternate within the components involved, without these mechanisms, which are typical for the use of a web service, being visible to the actual service user. The service user is only concerned with their requested service and does not have to deal with details of implementation via web services. Combining flexible web services based on internet technologies with automation system engineering significantly extends the functionality of the automation system at its outer interface. In particular this allows flexible and location-independent access to automation systems, the provision of new services for automation systems and the automation of services or the autonomous processing of services with or without manual initiation.

Automation systems can be coupled to different communication networks. According to a further advantageous embodiment of the invention the communication network is an intranet. Many different information-processing devices, for example PCs, laptops, mainframes, web servers, etc., can be connected to such an intranet. Some of these devices provide services, which can also be used by the components of the automation system. The different information-processing devices can have client or server functionalities, with a combination of the two functionalities also being possible in one device.

The automation system or service access means can take on the role of both client and server during the course of the services, if according to a further advantageous embodiment of the invention the service access means is also provided to provide further services in the communication network.

The claimed method can advantageously be used to implement software updates for the components of the automation system via the internet, in particular to implement firmware updates. This allows the component software to be loaded, updated or supplemented in a user-friendly and largely automatic manner.

BRIEF DESCRIPTION OF THE DRAWINGS

The invention is described in more detail below with reference to the exemplary embodiments shown in the figures, in which.

DETAILED DESCRIPTION OF INVENTION

Figure 1:
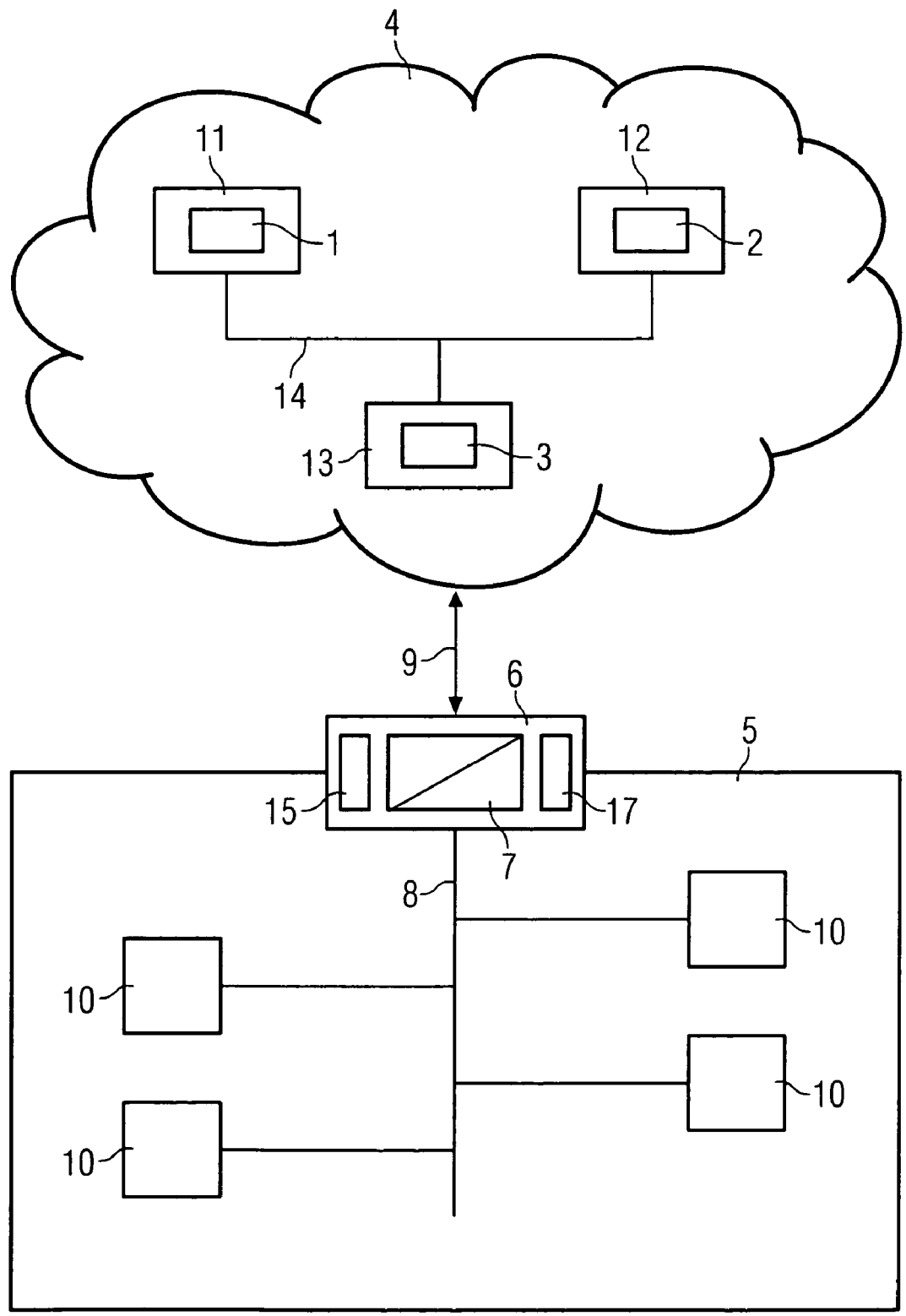
FIG. 1 shows a system for the use of services within a communication network with internet mechanisms and an automation system.

FIG. 1 shows a system for the use of services 1, 2 within a communication network 4 with internet mechanisms and an automation system 5. The components 10 of the automation system 5 are coupled together by means of a conventional field bus 8. A conventional field bus 8 here is understood to be a field bus which is not provided for communication according to internet standard protocols. The conventional field bus 8 of the automation system 5 is connected to the communication network 4 by means of at least one service access means 6. The service access means 6 is connected to the communication network 4 via a coupling 9. The service access means 6 is provided as client for the services 1, 2 provided in the communication network 4. The service access means 6 has transformation means 7, which are provided to adapt a first communication protocol of the services 1, 2 to a second communication protocol of the field bus 8. The second communication protocol of the field bus 8 is thereby the communication protocol used by the components 10 connected to the field bus 8 to handle communication via the field bus 8. The communication network 4 in the exemplary embodiment according to FIG. 1 has a central register means 3 to provide information about at least some of the services 1, 2. The service access means 6 also has search means 15, which can be used to search and address the central register means 3 in the communication network 4. The services 1, 2 and the central register means 3 can be provided using any information-providing means; in the exemplary embodiment they are provided using the computers 11, 12 and 13. The computers 11, 12, 13 are coupled together by means of connections 14 that are only shown schematically here. The connections 14 can thereby be internet connections, which are provided by the interaction of a large number of widely distributed communication users and connections (not shown here). The service access means 6 in the exemplary embodiment is also used to provide further services 17 in the communication network 4.

The transformation of services in the communication network 4 to services of automation systems 5 that can also be transmitted by means of the conventional field bus 8 is described in more detail below. The service access means 6 essentially provides a gateway between the lower-level conventional field bus 8 and the communication network 4, e.g. the internet. In addition to access to the conventional field bus 8 the service access means 6 also has a connection to the communication network 4 (internet/intranet) and software components, which allow it on the one hand to provide services itself in the communication network (e.g. web services) and on the other hand to operate as client for services/web services provided in the communication network 4. Data or services reaching the service access means 6 via the latter route can be injected into the conventional field bus 8 through the connection between the service access means and said field bus, after they have been correspondingly prepared by means of the transformation means 7 (e.g. protocol adaptation, conversion to specific services of the field bus system, previous continuing data processing, etc.). Depending on the complexity of the data processing, the service access means 6 can comprise just hardware or a combination of hardware and software.

Figure 2:
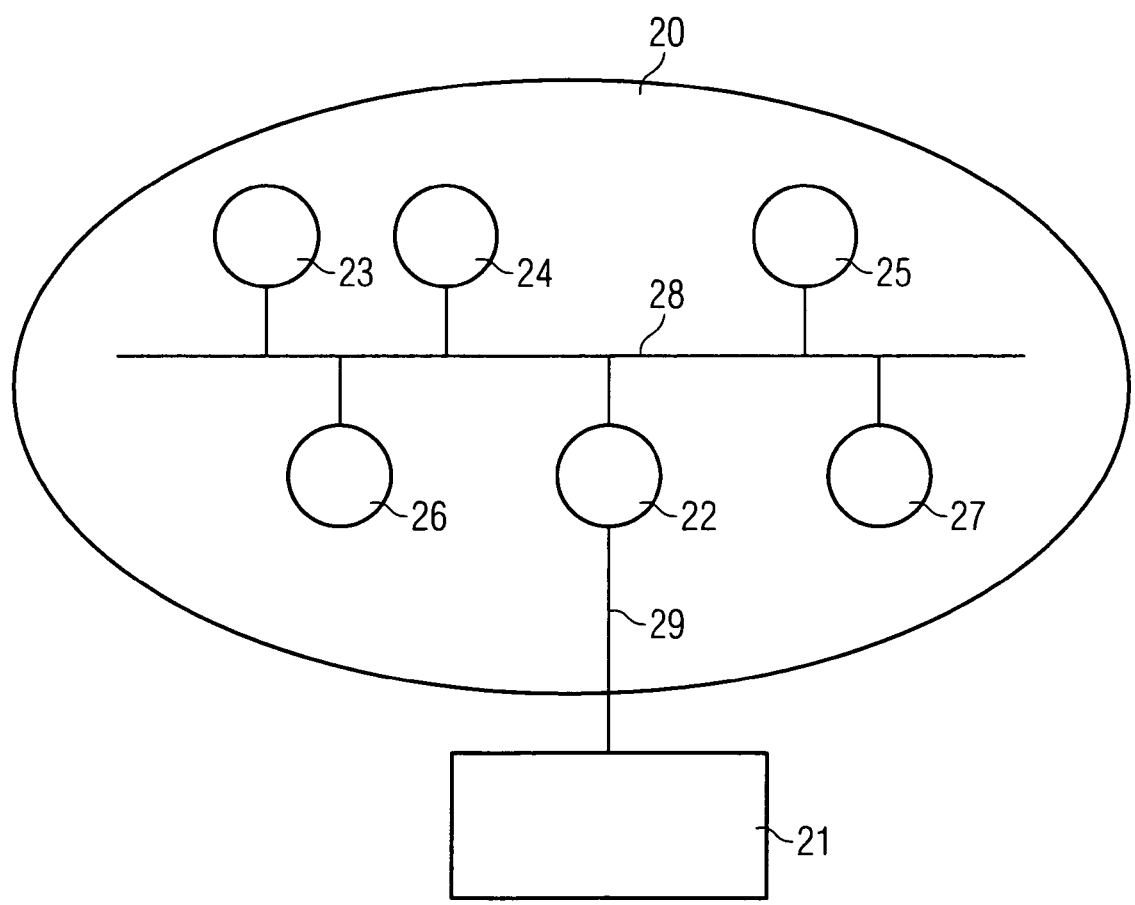
FIG. 2 shows a schematic diagram of a system for the use of web services in the internet by an automation system.

FIG. 2 shows a schematic diagram of a system for the use of services in the form of web services in the internet by an automation system. The automation system 21 is connected by means of a conventional field bus 29 to a service access means 22. Service providers 23, 24, 25, service users 26 and a central register means 27 are coupled together by means of internet connections 28 in an internet or intranet 20. A register means 27 is for example a platform-independent and programming-language-independent directory service according to the UDDI (Universal Description, Discovery and Integration) specification. The principal architecture is independent of whether web service components are present in the automation system 21 itself or separate service access is provided.

The principle of service use with the aid of the system proposed here is to be described in more detail below based on the exemplary embodiment according to FIG. 2. A service user in the automation system, e.g. an automation component, wishing to use a service in the internet or intranet 20, is directed to a suitable service provider 23 via a suitable selection routine, which operates with automatic or manual control. The service provider 23 will generally require further resources (e.g. database server) to implement the service. Any number of further service providers 24, 25 are therefore called on to implement the service. The roles of service provider and service user therefore alternate within the components involved, without these mechanisms, which are typical for the use of a web service, being visible to the actual user in the automation system 21. The service user is only concerned with their requested service and does not have to deal with details of implementation via web service mechanisms. The requested service must ultimately become active in the automation system 21. This is brought about by the service access means 22, which establishes the connection between web services and automation system 21. This service access means 21 can either be a specific component or part of the automation system. In the first instance it is possible to use a web service in an existing automation system (with specific communication mechanisms/protocols). In the second instance the service access means 22 and/or a service provider 23-25 (e.g. a web server) is/are part of the automation system. This reduces the number of components required in the system as a whole, which then however have to be integrated in the automation system.

Figure 3:
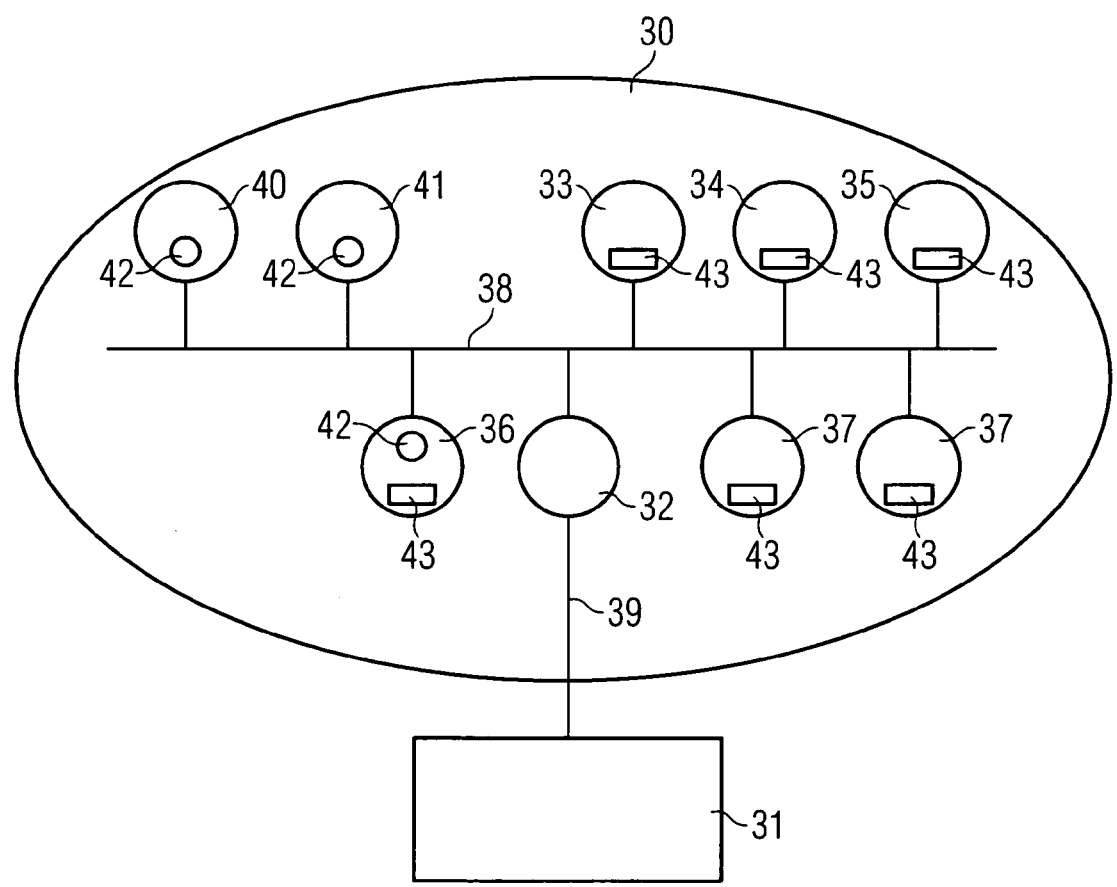
FIG. 3 shows a schematic diagram of a system for the use of a software update service by an automation system and FIG. 4 shows the operational sequence of a software update service.

FIG. 3 shows a schematic diagram of a system for the use of a software update service by an automation system 31. The automation system 31 is connected by means of a conventional field bus 39 to a service access means 32. The service access means 32 is connected by means of internet connections 38 to a number of service providers 33-36, central register means 37 and service users 40, 41 in an internet 30. These internet users each have the function of client 42 and/or server 43.

A system with the structure shown in FIG. 3 allows services for the automation system 31 to be commissioned from any location, thereby benefiting from the advantages of a widely distributed network, in the exemplary embodiment the internet 30. Automation systems 31 are generally coupled to different networks and increasingly to a local intranet or even the internet 30. Many different information-processing devices, for example PCs, laptops, mainframes, web servers etc., are connected to or together in these networks. Some of these devices provide servers, which can also be used by automation devices. The location of the service provider is thereby insignificant, as the internet is worldwide. It is therefore evident that users of a certain service can be located anywhere and can use said service for a specific (fixed) unit. The different information-processing devices can have client or server functionalities, with a combination of the two functionalities also being possible.

The use of the firmware update service is to be described with reference to the example in FIG. 3. A component of the automation system 31 connected to the field bus 39 in the automation system 31 sends a request relating to a firmware update to the internet 30 by means of the service access means 32. The automation component uses a central register 37 to find a service provider 36, which provides the required firmware update as a service. The service provider 36 in turn uses further service providers 33-35, which in the exemplary embodiment supply the required firmware. The operational sequence of such a firmware update service is to be set out with reference to FIG. 4.

Figure 4:
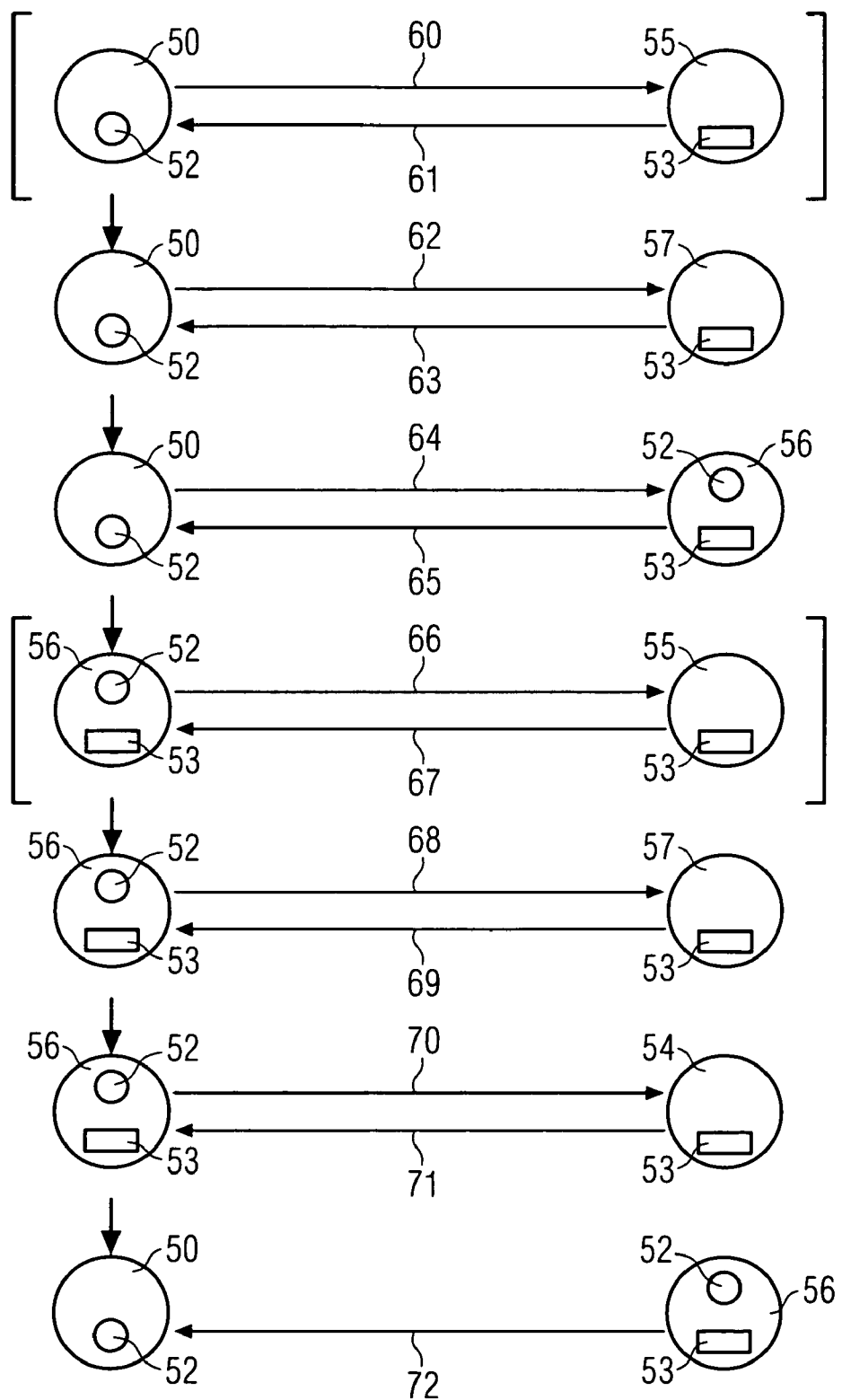

FIG. 4 shows an example of the operational sequence of a firmware update web service. The respective communication steps between the communication partners involved in a communication network are shown schematically. The communication partners each have the functionality of server 53 and/or client 52. The example of the operational sequence of a web service shows the use of the web service by any service user 50, but in particular by a service access means 32 according to FIG. 3, which supplies this service to an automation component in an automation system. The service user 50 at any location with a connection to the communication network, in particular the internet, can be a person at a computer or even an autonomously operating machine. The service user 50 wishes to use a firmware update web service and either knows the address of a central register means 57 or obtains this address using a search engine 55. In the latter instance the service user 50 sends a search request 60 for a register means 57 to a search engine 55, which then transmits the results 61 found to the service user 50. The service user then connects to one of the identified register means 57, e.g. a register server, and as client sends a request 62 for a web service with the required functionality (in this instance a firmware update service) to the register means 57. In response 63 it receives from the central register means 57 an overview of possible service providers 56 and their addresses in the communication network and a brief description of the services provided. In the next step the service user 50 selects one of the service providers 56 according to their specific requirements and connects to this server. The service user 50 as client sends a request 64 for a firmware update to the service provider 56, providing the latter with the necessary information about where the required data is to be sent, e.g. an automation component in an automation system. The service user 50 thereby negotiates the details of service implementation (address of the module to be updated, details of the update) with the service provider 56. The service provider 56 confirms the request of the service user 50 with an acknowledgment 65. In some instances the service provider 56 does not have all the data (e.g. firmware update files) necessary to implement the service it provides and must first obtain this from another web service. The procedure for this is similar: searching as an autonomous client by means of a request 66 to a search engine 55 for a register means 57, e.g. a directory. The search engine 55 transmits the results 67 found to the service provider 56. The service provider 56 then uses a request 68 to request a suitable service (in this instance firmware holders) from the register means 57 and as a result 69 obtains from the register means 57 the information where and how such a service is available. In the next step the service provider 56 as client uses a request 70 to request the necessary data from the firmware-holding server of the further service provider 54 found. The further service provider 54 as server transmits the information 71 provided to the service provider 56. Once the service provider 56 has all the necessary data for the implementation of the firmware update web service, it starts the provided service and informs the service user 50 via a message 72 of the status of web service processing.

In addition to the example of the use of a firmware update service described here, the described system and method can for example also be used for:
 diagnosis
 identification and maintenance functions
 process value display (snapshot)
 marketing of engineering services (sale of user software for automation units)
 loadable functions in automation devices
 teaching and practice tools To summarize, the invention therefore relates to a system and a method for the use of services 1, 2 within at least one communication network 4 with internet mechanisms and at least one automation system 5, as well as a service access means 6 for connecting an automation system 5 to a communication network 4. A system is proposed for the improved use of services 1, 2 within at least one communication network 4 with internet mechanisms and at least one automation system 5, with components 10 of the automation system 5 being coupled together by means of a conventional field bus 8, with a service access means 6 being provided to connect the conventional field bus 8 to the communication network 4, with the service access means 6 being provided as client for the services 1, 2 provided in the communication network 4 and with the service access means 6 having transformation means 7, which are provided to adapt a first communication protocol of the services 1, 2 to a second communication protocol of the field bus 8.

A summary of web service technology is given below, to clarify the invention further. This technology allows both direct communication between applications (the so-called services) and the setting up of applications from distributed components (again services), i.e. loosely connected web services can work together to complete a task. Web service technology uses standards such as XML and SOAP to scale from local communication to communication via the intranet/internet. It is the basis for distributed and integrated internet application, using existing standards (e.g. W3C, IETF standards such as HTTP, AL, XML Schema, XL Data Types, etc.) or new ones, together with W3C, IETF defined standards such as SOAP, WSDL, UDDI. Web service interfaces are described by meta-information (methods, parameters (names and types)), generally in WSDL (Web Service Description Language). This complete interface description is adequate to call web services. It describes the end point (port), at which the respective web service can be called and is particularly useful for automatic communication with web services. Web services are characterized by simple access, with the boundaries between local APIs and web services ("web APIs") blurring. Access is as simple as when generating and using a local object. Web service technology is therefore the basis for loosely coupled applications. It is characterized by message-based communication and scalability due to statelessness. The loose coupling (e.g. with SOAP) in particular has the advantage of good compatibility in respect of changes in implementation at client and server and reliable communication (port-based, message-based, asynchronous). In message-based systems a client packs messages into self-describing packets (messages) and sends them in this form via the respective communication connection. An agreement is only reached between sender and recipient in respect of the message format used on the line. The sole assumption is that the recipient understands the message. No assumptions are made as to what happens after receipt of the message or between sender and recipient. Standard web services have the following characteristics: They can be accessed via a communication network such as internet/intranet and have an XML interface. Information about web services is stored in a registry so that web services can be located using this. They communicate with the aid of XML messages via web protocols and support loosely coupled connections between systems.

The invention claimed is:

1. A system for using services provided by a communication network, the system comprising:
   a communication network having internet mechanisms and a central register database for providing information about the services accessible from the communication network;
   at least one automation system having hardware automation components connected by a conventional field bus, the automation components lacking internet mechanisms; and
   a service access unit operative as one element of the automation system and comprising at least a hardware element, the service access unit directly connected to the conventional field bus for connecting the conventional field bus to the communication network, wherein the service access unit operates as a client for requesting services, as requested by automation components, from the communication network and operates as a server for providing web services in the communication network, the service access unit further including a protocol converter for adapting a first communication protocol used by the services to a second communication protocol used by the field bus, thereby permitting the automation components to communicate with internet mechanisms of the communication network, the service access unit further comprising a search means for addressing the central register database, services requested by the service access unit becoming active in the automation system.

2. The system according to claim 1, wherein the services are web services.

3. The system according to claim 1, wherein the communication network is an intranet.

4. The system according to claim 1, wherein the service access unit provides further services in the communication network.

5. A method for using services provided in at least one communication network having internet mechanisms and at least one automation system comprising automation components connected by a conventional field bus, the method comprising:
   connecting the conventional field bus to the communication network by a service access unit, the automation components comprising hardware automation components and lacking internet mechanisms, the communication network having a central register database for providing information about the services accessible from the communication network, the service access unit operative as one element of the automation system and comprising at least a hardware element and directly connected to the conventional field bus;
   adapting a first communication protocol used by the services to a second communication protocol used by the field bus by a protocol converter included in the service access unit, thereby permitting the automation components to access internet mechanisms of the communication network; and
   accessing the services by the automation components using the service access unit as a client, the services requested by the automation components, wherein the service access unit operates as a server for providing services in the communication network, the service access unit comprising a search means for addressing the central register database, services requested by the service access unit becoming active in the automation system.

6. The method according to claim 5, wherein the services are web services.

7. The method according to claim 5, wherein the communication network is an intranet.

8. The method according to claim 5, wherein the service access unit provides further services in the communication network.

9. The method according to claim 5, wherein the services include executing a software update of at least one of the automation components.

10. A service access unit for connecting an automation system having hardware automation components to a communication network having internet mechanisms, the communication network having a central register database for providing information about the services accessible from the communication network, the service access unit comprising a protocol converter for adapting a first communication protocol used by the services to a second communication protocol used by a conventional field bus, the automation components lacking internet mechanisms, the service access unit operative as one element of the automation system and comprising at least a hardware element, the service access unit directly connected to the conventional field bus, the conventional field bus connecting the automation components, wherein the service access unit further operates as a client for requesting services from the communication network, or as a server for providing services in the communication network and permitting the automation components to communicate with the internet mechanisms of the communications network, the service access unit further comprising a search means for addressing the central register database, services requested by the service access unit becoming active in the automation.

* * * * *